United States Patent [19]

Ng et al.

[11] 4,094,520
[45] June 13, 1978

[54] SELF CENTERING FLANGE GASKET ASSEMBLY

[75] Inventors: Wahling H. Ng, Rockaway; Andrew Zaycer, Dover, both of N.J.

[73] Assignee: The United States of America as represented by the Secretary of the Army, Washington, D.C.

[21] Appl. No.: 841,092

[22] Filed: Oct. 11, 1977

Related U.S. Application Data

[62] Division of Ser. No. 793,023, May 2, 1977.

[51] Int. Cl.² ............................................. F16J 15/10
[52] U.S. Cl. ................................... 277/166; 285/177; 285/363
[58] Field of Search ................. 277/11, 166, 180, 236, 277/212 F; 285/177, 363

[56] References Cited

U.S. PATENT DOCUMENTS

| 2,170,915 | 8/1939 | Schweitzer | 277/212 F |
|---|---|---|---|
| 2,554,622 | 5/1951 | Jones | 277/212 F |
| 3,053,544 | 9/1962 | Gorsica | 277/166 |
| 3,338,597 | 8/1967 | Mason | 285/177 |
| 3,473,813 | 10/1969 | Meyers et al. | 277/166 |
| 3,726,178 | 4/1973 | Dimitry | 277/166 |
| 3,930,656 | 1/1976 | Jelinek | 277/166 |

*Primary Examiner*—Robert I. Smith
*Attorney, Agent, or Firm*—Nathan Edelberg; A. Victor Erkkila; Max Yarmovsky

[57] ABSTRACT

A circularly shaped rimmed gasket, having an axially aligned central bore transversely disposed therethrough, utilizes oppositely disposed annular grooves located in exterior faces of the gasket to form sealing surfaces intermediate two axially positioned raised boss sealing faces of a pipe flange. The projecting sides of the rim of the gasket nestles around each flange boss helping to axially align the pipe flanges with minimum effort and visibility.

3 Claims, 4 Drawing Figures

SELF CENTERING FLANGE GASKET ASSEMBLY

GOVERNMENTAL INTEREST

The invention described herein may be manufactured, used and licensed by or for the Government for governmental purposes without the payment to me of any royalty thereon.

This is a division of application Ser. No. 793,023, filed May 2, 1977.

BACKGROUND OF THE INVENTION

The development of a continuous production method for explosive materials has in some instances required the need for transporting molten explosives through the process lines from a melter to a pouring unit. Usually a special pumping unit is utilized to handle the high viscosity explosive slurries. In order to maintain a desirable temperature range throughout the whole process system, a stainless steel jacketed piping arrangement heated with steam is provided. The jacketed piping requires raised face flanges on the connecting transmission lines. A remote multi-head heater containing a plurality parallel transmission lines holds a fire resistant fluid which is used to maintain the explosive material temperature inside the pipeline. The problem frequently encountered with the multiple remote heads inside the head heater is that the assembly operations are signtless and no positive inspection can be made to assure the proper alignment and seating of the multiple mating flanges with their associated gaskets. Frequently it is difficult to assemble and align a plurality of flange joints being fixedly held in a concentric position with prior art gaskets due to the rigidity of the manifolds and the hidden flange arrangements of the pump piping system inside the multi-head heater. In the past eccentric gasket assemblies and alignment problems frequently caused leakage at the joint and or restriction of the flow of the material. Another problem with prior art flange gasket assemblies was that misassembled flange gasket assemblies caused the entrapment of explosive particles therein creating a potential hazardous condition.

SUMMARY OF THE INVENTION

The invention relates to a positively acting, self-centering gasket which achieves centering of raised boss type flanges by mating the physical configurations of the recessed annular portions of the rimmed circularly shaped gasket with the concentric serrated portions of the raised boss face of transmission pipe flanges. The rims of the gasket nestling the boss of the flange within the annular groove of the gasket and automatically axially aligning the transmission lines with the central axial hole of the gasket.

An object of the present invention is to provide a pipe flange gasket which insures substantially perfect connection between the mating raised boss face portion of pipe flanges.

Another object of the present inventions is to provide a pipe flange gasket which automatically helps to centralize the alignment of raised boss face portions of pipe flanges of a pipe joint.

Another object of the present invention is to provide a pipe flange gasket which insures axial alignment between mating raised boss face portions of pipe flanges which are difficult to visually inspect.

Another object of the present invention is to provide a pipe flange gasket which will insure smooth transition of fluidic flow between two similar or different sizes of pipe connections.

A further object of the present invention is to provide a pipe flange gasket which will avoid the accumulation of materials between mating flanges of transmission lines of different size.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENTS

Figure 1:
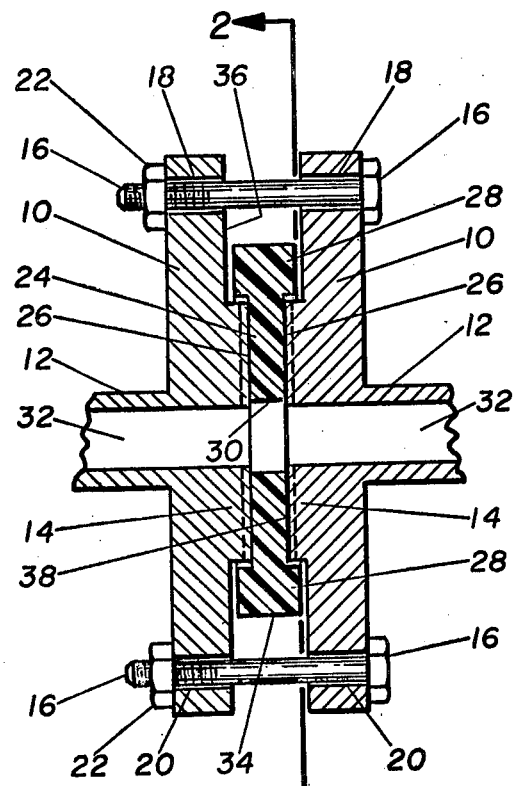
FIG. 1 is a cross-sectional view of a pair of pipe flanges and a self centering flange gasket showing transmission lines of the same size.
Figure 2:
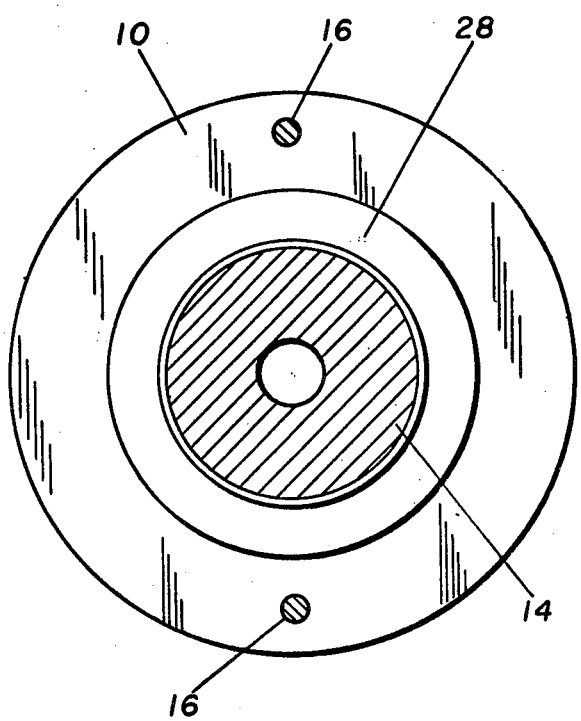
FIG. 2 is a view taken along line 2—2 of FIG. 1.

Referring now to FIGS. 1 and 2 a pair of symetrically shaped pipe flanges 10 each have integral equal size tubularly shaped transmission line connections 12 axially protruding from exterior sides thereof. The interior side of each flange 10 has an axially disposed raised annular circular boss 14 thereon. A plurality of threaded bolts 16 are diametrically disposed and axially aligned in flange bolt holes 18 and 20. Nuts 22 fixedly hold a circular rimmed gasket 24, made of such material as tetrfluoroethylene, intermediate concentrically ringed, circularly serrated face 26 disposed in flange bosses 14. The raised rim 28 of gasket 24 positions and locks the bosses 14 so that the 24 is in axial alignment with axial flange bores 32. Central bore 30 is made slightly larger than the diameter of the coaxially aligned flange bores 32 in order to minimize the amount of gasket material exposed to the explosive, corrosive, fluidic material in the transmission pipe line. The outer diameter of gasket 24 has a peripheral edge 34 which is designed to be non-interferring with the flange fastening bolts 16. It is critical in the design of the gasket configuration to provide sufficient clearance between the annular rim 28 of gasket 24 and shoulders section 36 of flanges 10 in order to insure positive contact between serrated sealing surfaces 26 and the counterbored gasket sealing surfaces 38. Sufficient clearance is provided between rim 28 and shoulders 36 in order to insure separation between these parts after completion of torquing both 16 and nuts 22.

Figure 3:
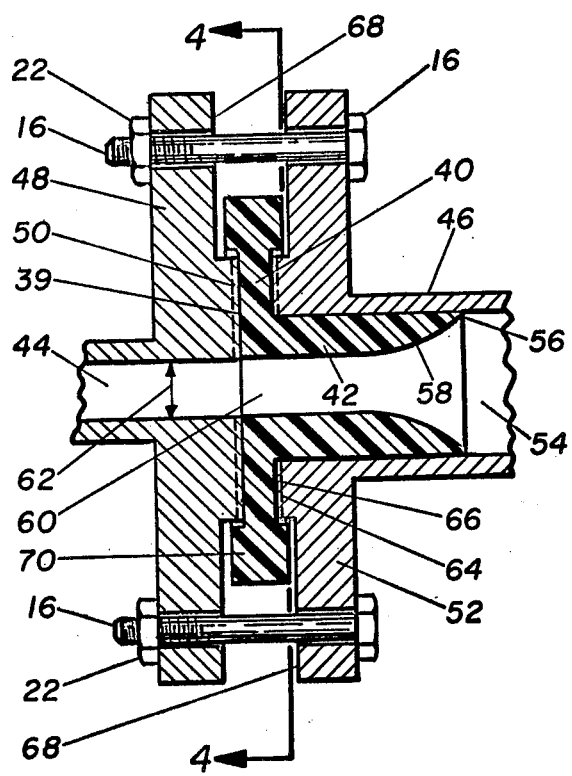
FIG. 3 is a cross-sectional view of a pair of pipe flanges and a self centering flange gasket showing transmission lines of unequal size.
Figure 4:
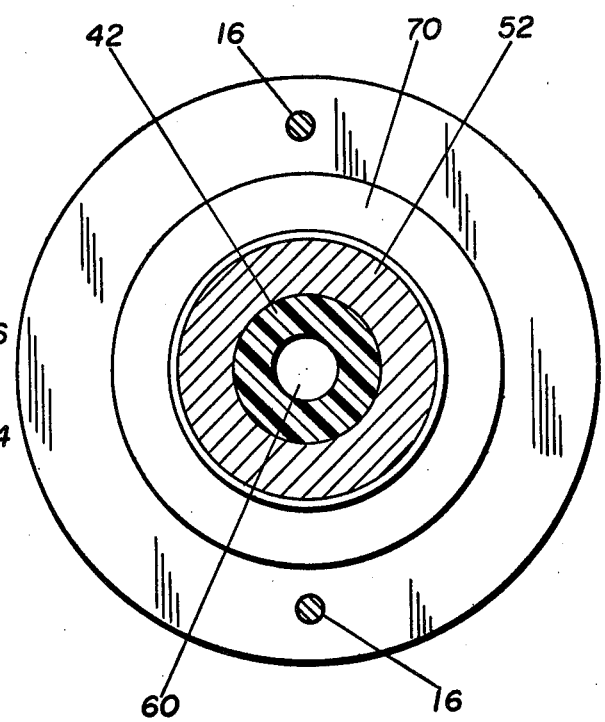
FIG. 4 is a view taken along line 3—3 of FIG. 3.

Referring now to FIGS. 3 and 4 a gasket 40, made of material such as tetrafluoraethylene, having a protrusion section 42 thereon is designed for connecting a small pipeline section 44 to a larger diameter pipeline section 46 having minimum turbulence associated with the transition. The left hand small bore pipe flange member 48, is designed exactly like pipe flanges 10 aforedescribed, seals against counterbore surface 39 of gasket 40 at raised boss circularly serrated sealing section 50. The right hand large bore pipe flange member 52 has an axial bore 54 therein which is larger than the bore in pipeline connection 44. Protrusion section 42 is designed so that it slidably, yet tightly, fits against the interior wall surface of pipeline 46. The tubular protrusion section end 56 has an internally curved venturi section 58 to insure smooth transition of the fluidic flow path which is critical in handling molten explosive materials. The other end of the protrusion section 42 has an axial cylindrical bore 60 which communicates with venturi section 58 and is designed to be slightly larger than the diameter of the small pipe flange axial bore 62 in order to minimize the amount of gasket material exposed to the explosive or corrosive materials being transmitted through the pipelines 44 and 54 as previously discussed for the flange-gasket assembly illustrated in FIGS. 1 and 2. Large bore pipeline flange member 52 also has a raised boss having circular concentric grooves 64 therein which come into sealing contact with gasket annular counterbore sealing surface 66 when nuts 22 are tightened upon bolts 16. Each of the flanges 48 and 52 have shoulder sections 68 on their opposing faces. Positive contact between the serrated sealing surfaces 50 and 64 and the counterbore gasket sealing surfaces 39 and 66 respectively is achieved by the clearance provided between gasket locating rim 70 and shoulder sections 68.

The foregoing disclosure and drawings are merely illustrative of the principles of this invention and are not to be interpreted in a limiting sense.

We wish it to be understood that we do not desire to be limited to the exact details of construction shown and described for obvious modifications will occur to a person skilled in the art.

Having thus fully described the invention, what is claimed as new and desired to be secured by Letters Patent of the United States is:

1. A self centering flange gasket assembly for use in making connections to pipelines of unequal size carrying molten explosive materials therein which comprises:
 a first circularly shaped pipe flange having a first axially aligned bore therethrough, a raised annular circularly shaped first flange boss thereon and an annular shoulder section on an interior side, said first flange boss having concentrically ringed circularly serrated grooves in the face thereof, said first pipe flange having an integral tubularly shaped transmission line connection section axially protruding from an exterior side thereof, and a first plurality of diametrically disposed flange bolt holes therethrough;
 a second circularly shaped pipe flange having a second axially aligned bore therethrough, said second axially aligned bore being larger than said first axial bore of said first pipe flange, a second raised annular circularly shaped flange boss thereon and an annular second shoulder section on an interior side, said second flange boss having concentrically ringed circularly serrated grooves in a face thereof, said second pipe flange having a second integral tubularly shaped transmission line connection section axially protruding from an exterior side thereof, and a second plurality of diametrically disposed flange bolt holes therethrough said second flange bolt holes being in axial alignment with said first flange bolt holes;
 a circular rim shaped venturi gasket having an axially aligned tubular protrusion section extending perpendicularly from a first face thereof, said protrusion section having an internally curved venturi section on one end which communicates with an axial cylindrical bore on the other end, an annular counterbore surface disposed on the other face of said gasket adjacent said serrated grooves of said flange boss of said first pipe flange, a second gasket annular counterbore sealing surface disposed on said first face of said venturi gasket, said second gasket sealing surface being disposed adjacent to and in sealing contact with said serrated grooves of said second flange boss, said tubular protrusion section slidably tightly fitting within said second axially aligned bore of said second pipe flange, and a gasket locating rim operatively disposed intermediate said shoulder sections of said first and second pipe flanges; and
 threaded bolt means operatively disposed in said pair of first and second flange bolt holes, for holding said rim shaped venturi gasket intermediate said first and second pipe flanges, the rim of said gasket nesting intermediate said first and second flange shoulder sections, said annular grooves of said gasket being located in sealing contact with said serrated grooves of said first and second flange bosses.

2. A self centering flange gasket assembly as recited in claim 1 wherein said axial cylindrical bore diameter is slightly larger than said first axially aligned bore of said first pipe flange to minimize the amount of gasket material exposed to said molten explosive material.

3. A self centering flange gasket assembly as recited in claim 2 wherein said venturi gasket further includes a gasket made of tetrafluoroethylene.

* * * * *